(12) United States Patent
Nishiura et al.

(10) Patent No.: US 10,595,467 B2
(45) Date of Patent: Mar. 24, 2020

(54) SEEDLING-CUTTING APPARATUS, AND GRAFTING APPARATUS HAVING SEEDLING-CUTTING APPARATUS

(71) Applicants: OSAKA PREFECTURE UNIVERSITY PUBLIC CORPORATION, Sakai-shi, Osaka (JP); KUSAKABE KIKAI CO., LTD., Toyonaka-shi, Osaka (JP)

(72) Inventors: Yoshifumi Nishiura, Izumi (JP); Koji Shimada, Kusatsu (JP); Yoshio Yasukuri, Sakai (JP)

(73) Assignees: OSAKA PREFECTURE UNIVERSITY PUBLIC CORPORATION, Sakai-shi (JP); KUSAKABE KIKAI CO., LTD., Toyonaka-shi (JP)

( * ) Notice: Subject to any disclaimer, the term of this patent is extended or adjusted under 35 U.S.C. 154(b) by 328 days.

(21) Appl. No.: 15/529,206

(22) PCT Filed: Nov. 25, 2015

(86) PCT No.: PCT/JP2015/083129
§ 371 (c)(1),
(2) Date: May 24, 2017

(87) PCT Pub. No.: WO2016/084867
PCT Pub. Date: Jun. 2, 2016

(65) Prior Publication Data
US 2017/0325409 A1 Nov. 16, 2017

(30) Foreign Application Priority Data
Nov. 26, 2014 (JP) ................................ 2014-238886

(51) Int. Cl.
*A01G 3/00* (2006.01)
*A01G 2/32* (2018.01)
*A01G 2/35* (2018.01)

(52) U.S. Cl.
CPC ............... *A01G 3/00* (2013.01); *A01G 2/32* (2018.02); *A01G 2/35* (2018.02)

(58) Field of Classification Search
USPC .............................. 47/6, 7, 58.1 R, DIG. 3
See application file for complete search history.

(56) References Cited

U.S. PATENT DOCUMENTS

| 5,499,578 | A | * | 3/1996 | Payne | A47J 43/18 30/114 |
| 5,524,386 | A | * | 6/1996 | Honami | A01G 2/30 47/6 |
| 6,918,205 | B1 | * | 7/2005 | Sowinski | A01G 2/30 47/6 |

FOREIGN PATENT DOCUMENTS

| JP | 48-80322 A | 10/1973 |
| JP | 9-107796 A | 4/1997 |

(Continued)

OTHER PUBLICATIONS

International Search Report, issued in PCT/JP2015/083129, PCT/ISA/210, dated Mar. 1, 2016.
(Continued)

*Primary Examiner* — Andrea M Valenti
(74) *Attorney, Agent, or Firm* — Birch, Stewart, Kolasch & Birch, LLP (57) ABSTRACT

A seedling-cutting apparatus includes a pair of arms that is to nip a portion of a stem of a seedling for grafting and that can be opened and closed and a blade that is provided so as to be capable of reciprocating relative to the portion of the stem. At least one of the pair of arms includes a through hole or a cutout that penetrates a portion of the arms along a
(Continued)

direction in which the blade reciprocates. At least a portion of the through hole or the cutout faces the portion of the stem and at least a portion of the blade moves through the through hole or the cutout.

6 Claims, 10 Drawing Sheets

(56) References Cited

FOREIGN PATENT DOCUMENTS

| JP | 2004-194544 | * | 7/2004 | ............... A01G 1/06 |
|----|-------------|---|--------|---------------------------|
| JP | 2004-194544 A | | 7/2004 | |
| JP | 2004-350550 A | | 12/2004 | |
| JP | 2008-295408 A | | 12/2008 | |
| JP | 2009-112261 A | | 5/2009 | |
| JP | 2010-166877 A | | 8/2010 | |
| JP | 2014-73090 A | | 4/2014 | |
| JP | 2014-73093 A | | 4/2014 | |

OTHER PUBLICATIONS

Written Opinion of the International Searching Authority, issued in PCT/JP2015/083129, PCT/ISA/237, dated Mar. 1, 2016.
English translation of the International Preliminary Report on Patentability (Form PCT/IPEA/409) for Application No. PCT/JP2015/083129, dated May 26, 2017.
Extended European Search Report for Application No. 15862639.0, dated Jun. 18, 2018.

\* cited by examiner

SEEDLING-CUTTING APPARATUS, AND GRAFTING APPARATUS HAVING SEEDLING-CUTTING APPARATUS

TECHNICAL FIELD

The present invention relates to a seedling-cutting apparatus and to a grafting apparatus having the seedling-cutting apparatus.

BACKGROUND ART

A conventional seedling-cutting apparatus is disclosed in JP H09-107796 A (PTL 1). The seedling-cutting apparatus includes cutting devices that are to cut seedlings for grafting and grippers that are to grip the seedlings. Portions of stems of the seedlings are gripped by the grippers and portions of the stems of the seedlings that are not gripped by the grippers are cut by the cutting devices.

When the stems are cut by the cutting devices in the conventional seedling-cutting apparatus, however, the portions of the stems that are not gripped by the grippers may be deformed by the cutting devices in case where the stems of the seedlings have low rigidity. Thus a problem is caused in that variations may occur in cutting positions on the stems, shapes of cut surfaces of the stems, and/or the like.

CITATION LIST

Patent Literature

PTL 1: JP H09-107796 A

SUMMARY OF INVENTION

Technical Problem

It is an object of the invention to provide a seedling-cutting apparatus by which cutting positions on stems of seedlings for grafting, shapes of cut surfaces of the stems, and the like can be made constant.

It is another object of the invention to provide a grafting apparatus that has the seedling-cutting apparatus.

Solution to Problem

In order to solve the problem, a seedling-cutting apparatus of the invention includes a pair of openable and closable arms that is configured to nip a portion of a stem of a seedling for grafting, and a blade that is provided so as to be capable of reciprocating relative to the portion of the stem to cut the stem, and wherein at least one of the pair of arms includes a through hole or a cutout that penetrates a portion of the arm along a direction in which the blade reciprocates, wherein at least a portion of the through hole or the cutout faces the portion of the stem, and wherein at least a portion of the blade moves through the through hole or the cutout.

In an above configuration, at least the portion of the through hole or the cutout faces the portion of the stem, and at least the portion of the blade moves through the through hole or the cutout so as to cut the stem. Therefore, the blade cuts the portion of the stem that is nipped and fixed by the pair of arms and thus deformation of the stem in accordance with rigidity of the stem and resultant variations in cutting position on the stem, shape of a cut surface of the stem, and/or the like can be prevented. As a result, the cutting position, the shape of the cut surface, and the like can be made constant.

In the seedling-cutting apparatus of an embodiment, the through hole or the cutout extends from a nipping surface of the arm that is to nip the stem to a surface of the arm that is opposed to the nipping surface.

In the embodiment, the through hole or the cutout extends from the nipping surface to the surface that is opposed to the nipping surface. Therefore, the through hole is independently formed on one of the pair of arms and thus there is no change in position and shape of a path of the blade that is formed of the through hole even if a position where the pair of arms nips the stem is changed because the stem has a large size, for instance. As a result, the cutting position, the shape of the cut surface, and the like can more reliably be made constant.

In other words, the through hole or the cutout extends from the nipping surface to the surface that is opposed to the nipping surface and thus the path through which the whole blade can pass can be defined by only the through hole or the cutout formed on one of the pair of arms. Consequently, there is no change in the shape of the path even if a distance between the pair of arms is increased because the pair of arms nips the portion of the stem that is thick, for instance. Therefore, the blade can reliably be made to reach the stem even if a thickness of the stem varies.

In the seedling-cutting apparatus of an embodiment, a shape of the through hole is generally the same as a shape of the blade as seen looking in the direction in which the blade reciprocates.

In the embodiment, the shape of the through hole is generally the same as the shape of the blade as seen looking in the direction in which the blade reciprocates and thus the blade can be guided by the through hole when the blade moves through the through hole. As a result, the blade can be prevented from being greatly deformed.

In the seedling-cutting apparatus of an embodiment, the blade is shaped like a letter y as seen looking in the direction in which the blade reciprocates.

In the embodiment, the blade is shaped like the letter y as seen looking in the direction in which the blade reciprocates. In a case where the cut surface of the stem of the seedling as a rootstock is to be shaped like the letter y in order that a survival rate in grafting may be increased, for instance, therefore, the stem has only to be cut one time by the blade and thus the cut surface of the stem can easily and reliably be shaped like the letter y.

A grafting apparatus of the invention is characterized in that the grafting apparatus includes the seedling-cutting apparatus.

In the grafting apparatus having an above configuration, which includes the seedling-cutting apparatus and in which the stems of a scion seedling and the rootstock seedling are cut by the seedling-cutting apparatus, variations in cutting positions on the stems of the scion seedling and the rootstock seedling, the shapes of the cut surfaces of the stems, and the like can be prevented and the cutting positions, the shapes of the cut surfaces, and the like can be made constant. As a result, the cut surface of the scion seedling can easily and reliably be made to coincide with the cut surface of the rootstock seedling, so that the survival rate in grafting between the scion seedling and the rootstock seedling can be increased.

Advantageous Effects of Invention

In the seedling-cutting apparatus and the grafting apparatus of the invention, the portion of the stem of the seedling for grafting that is nipped is cut and thus the cutting position on the stem, the shape of the cut surface of the stem, and the like can be made constant.

DESCRIPTION OF EMBODIMENTS

Hereinbelow, the invention will be described in detail with reference to embodiments illustrated in the drawings.

Figure 1:
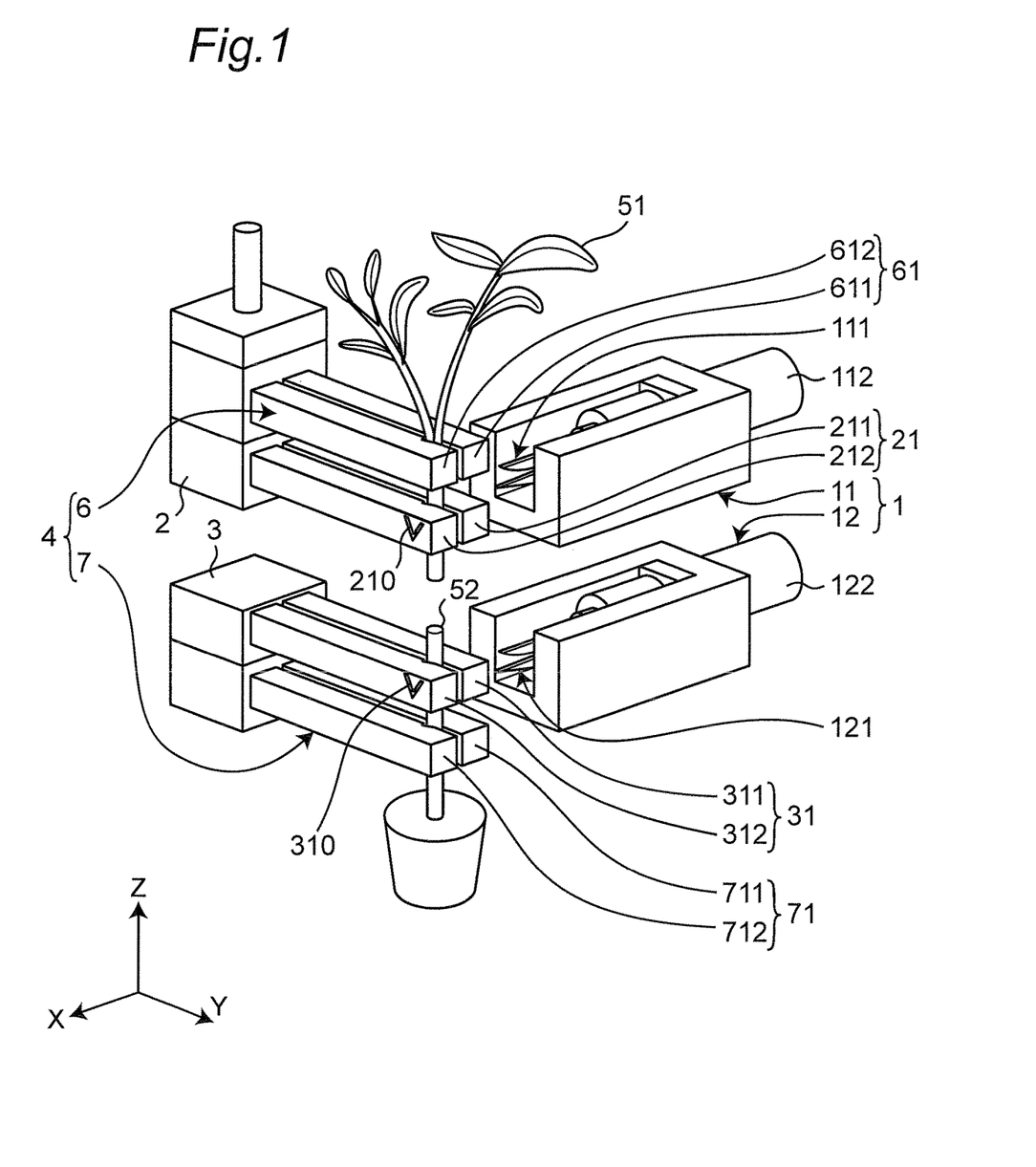
FIG. 1 is a schematic perspective view of a grafting apparatus in accordance with an embodiment of the invention.

FIG. 1 illustrates a schematic perspective view of a grafting apparatus in accordance with an embodiment of the invention.

As illustrated in FIG. 1, the grafting apparatus includes a cutting unit 1, a scion clip 2, a rootstock clip 3, and a seedling moving unit 4. A seedling-cutting apparatus is composed of the cutting unit 1, the scion clip 2, and the rootstock clip 3.

The scion clip 2 is provided so that the scion clip 2 can be moved in Y direction by an air cylinder not illustrated. The scion clip 2 includes an arm part 21 that is to nip a portion of a stem of a scion seedling 51.

The arm part 21 includes two arms 211 and 212 that extend in the Y direction in parallel with each other and that are each generally shaped like a rectangular parallelepiped.

The arms 211 and 212 are arranged in a row in X direction and are provided so that the arms can respectively be moved in the X direction by air cylinders not illustrated. The arms 211 and 212 can be opened and closed by being moved in the X direction. That is, the X direction is a direction in which the arms 211 and 212 are opened and closed. The arms 211 and 212 nip the portion of the stem of the scion seedling 51 from lateral sides, that is, from the X direction. A through hole 210 is formed on one end part of each of the arms 211 and 212 with respect to the Y direction. The pair of arms 211 and 212 is an example of a pair of arms of the invention. The through hole 210 is an example of a through hole of the invention.

The through hole 210 on the arm 211 is a through hole that extends in the X direction from a nipping surface of the arm 211 that is to nip the stem of the scion seedling 51 to a surface of the arm 211 that is opposed to the nipping surface with respect to the X direction. The through hole 210 on the arm 212 is a through hole that extends in the X direction from a nipping surface of the arm 212 that is to nip the stem of the scion seedling 51 to a surface of the arm 212 that is opposed to the nipping surface with respect to the X direction. The through hole 210 is shaped like a letter V as seen looking in the X direction. That is, a shape of the through hole 210 as seen looking in the X direction is similar to a cutting shape of the scion seedling 51. A portion of the through hole 210 faces the portion of the stem of the scion seedling 51 that is nipped by the arm part 21.

The rootstock clip 3 is provided so that the rootstock clip 3 can be moved in the Y direction by an air cylinder not illustrated. The rootstock clip 3 includes an arm part 31 that is to nip a portion of a stem of a rootstock seedling 52.

The arm part 31 includes two arms 311 and 312 that extend in the Y direction in parallel with each other and that are each generally shaped like a rectangular parallelepiped. The arms 311 and 312 are arranged in a row in the X direction and are provided so that the arms can respectively be moved in the X direction by air cylinders not illustrated. The arms 311 and 312 can be opened and closed by being moved in the X direction. That is, the X direction is a direction in which the arms 311 and 312 are opened and closed. The arms 311 and 312 nip the portion of the stem of the rootstock seedling 52 from lateral sides, that is, from the X direction. A through hole 310 is formed on one end part of each of the arms 311 and 312 with respect to the Y direction. The pair of arms 311 and 312 is an example of the pair of arms of the invention. The through hole 310 is an example of the through hole of the invention.

The through hole 310 on the arm 311 is a through hole that extends in the X direction from a nipping surface of the arm 311 that is to nip the stem of the rootstock seedling 52 to a surface of the arm 311 that is opposed to the nipping surface with respect to the X direction. The through hole 310 on the arm 312 is a through hole that extends in the X direction from a nipping surface of the arm 312 that is to nip the arm 312 of the rootstock seedling 52 to a surface of the same that is opposed to the nipping surface with respect to the X direction. The through hole 310 is shaped like a letter V as seen looking in the X direction. That is, a shape of the through hole 310 as seen looking in the X direction is similar to a cutting shape of the rootstock seedling 52. A portion of the through hole 310 faces the portion of the stem of the rootstock seedling 52 that is nipped by the pair of arms 31. As seen looking in the X direction, widths (widths corresponding to thicknesses of lines in the letter V) of portions of the through hole 310 are sufficiently greater than a thickness of a blade 111 so that the blade 111 can be inserted into the through hole 310.

The seedling moving unit 4 includes a scion moving clip 6 for nipping and moving the stem of the scion seedling 51 and a rootstock nipping clip 7 for nipping the stem of the rootstock seedling 52.

The scion moving clip 6 is placed above the scion clip 2 and is provided so that the scion moving clip 6 can be moved in Z direction by an air cylinder not illustrated. The scion moving clip 6 includes an arm part 61 that is to nip a portion of the stem of the scion seedling 51.

The arm part 61 includes two arms 611 and 612 that extend in the Y direction in parallel with each other and that are each generally shaped like a rectangular parallelepiped. The arms 611 and 612 are arranged in a row in the X-direction and are provided so that the arms can respectively be moved in the X-direction by air cylinders not illustrated. The arms 611 and 612 can be opened and closed by being moved in the X direction. The arms 611 and 612 nip the portion of the stem of the scion seedling 51 from lateral sides, that is, from the X direction.

The rootstock nipping clip 7 is placed under the rootstock clip 3. The rootstock nipping clip 7 includes an arm part 71 that is to nip a portion of the stem of the rootstock seedling 52.

The arm part 71 includes two arms 711 and 712 that extend in the Y direction in parallel with each other and that are each generally shaped like a rectangular parallelepiped. The arms 711 and 712 are arranged in a row in the X direction and are provided so that the arms can respectively be moved in the X direction by air cylinders not illustrated. The arms 711 and 712 can be opened and closed by being moved in the X direction. The arms 711 and 712 nip the portion of the stem of the rootstock seedling 52 from lateral sides, that is, from the X direction.

The cutting unit 1 includes a scion cutting unit 11 that is to cut the scion seedling 51 and a rootstock cutting unit 12 that is to cut the rootstock seedling 52.

The scion cutting unit 11 extends in the X direction and is placed in −X direction from the arm parts 21 and 61. The scion cutting unit 11 includes the blade 111 and an air cylinder 112. The blade 111 is provided so that the blade 111 can be moved in the X direction by the air cylinder 112. More specifically, the blade 111 can be reciprocated relative to the portion of the stem of the scion seedling 51 that is nipped by the arm part 21. As seen looking in a direction in which the blade 111 reciprocates, that is, the X direction, the blade 111 is shaped like a letter V so that the blade 111 may have generally the same shape as the through hole 210 on the arms 211 and 212 has. The blade 111 is an example of a blade of the invention.

The rootstock cutting unit 12 extends in the X direction and is placed in the -X direction from the pair of arms 31, 71. The rootstock cutting unit 12 includes a blade 121 and an air cylinder 122. The blade 121 is provided so that the blade 121 can be moved in the X direction by the air cylinder 122. More specifically, the blade 121 can be reciprocated relative to the portion of the stem of the rootstock seedling 52 that is nipped by the pair of arms 31. As seen looking in a direction in which the blade 121 reciprocates, that is, the X direction, the blade 121 is shaped like a letter y so that the blade 121 may have generally the same shape as the through hole 310 on the arms 311 and 312 has. The blade 121 is an example of the blade of the invention.

Figure 2:
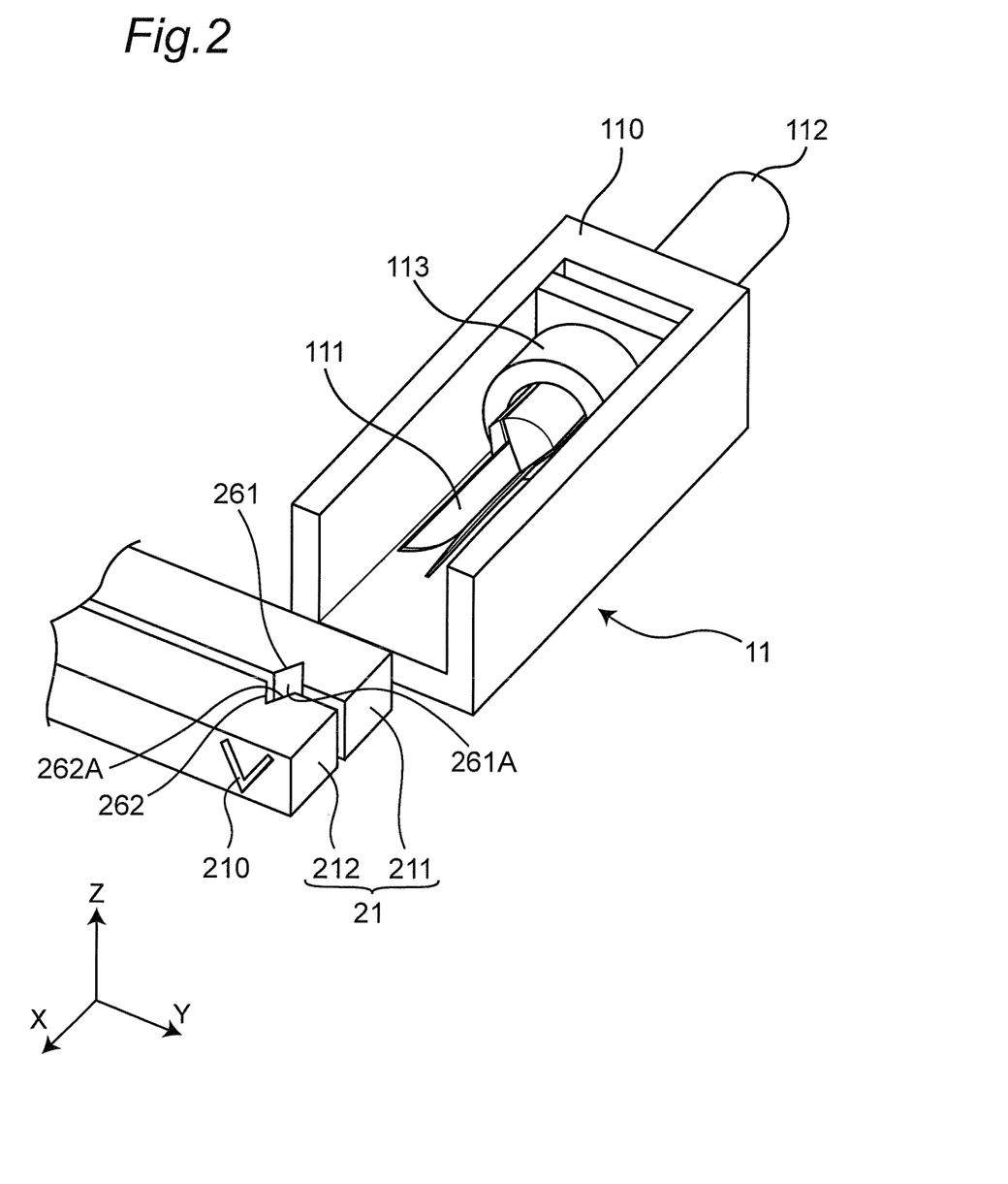
FIG. 2 is a schematic perspective view that magnifies and illustrates a cutting unit and a vicinity thereof in the grafting apparatus.
Figure 3:
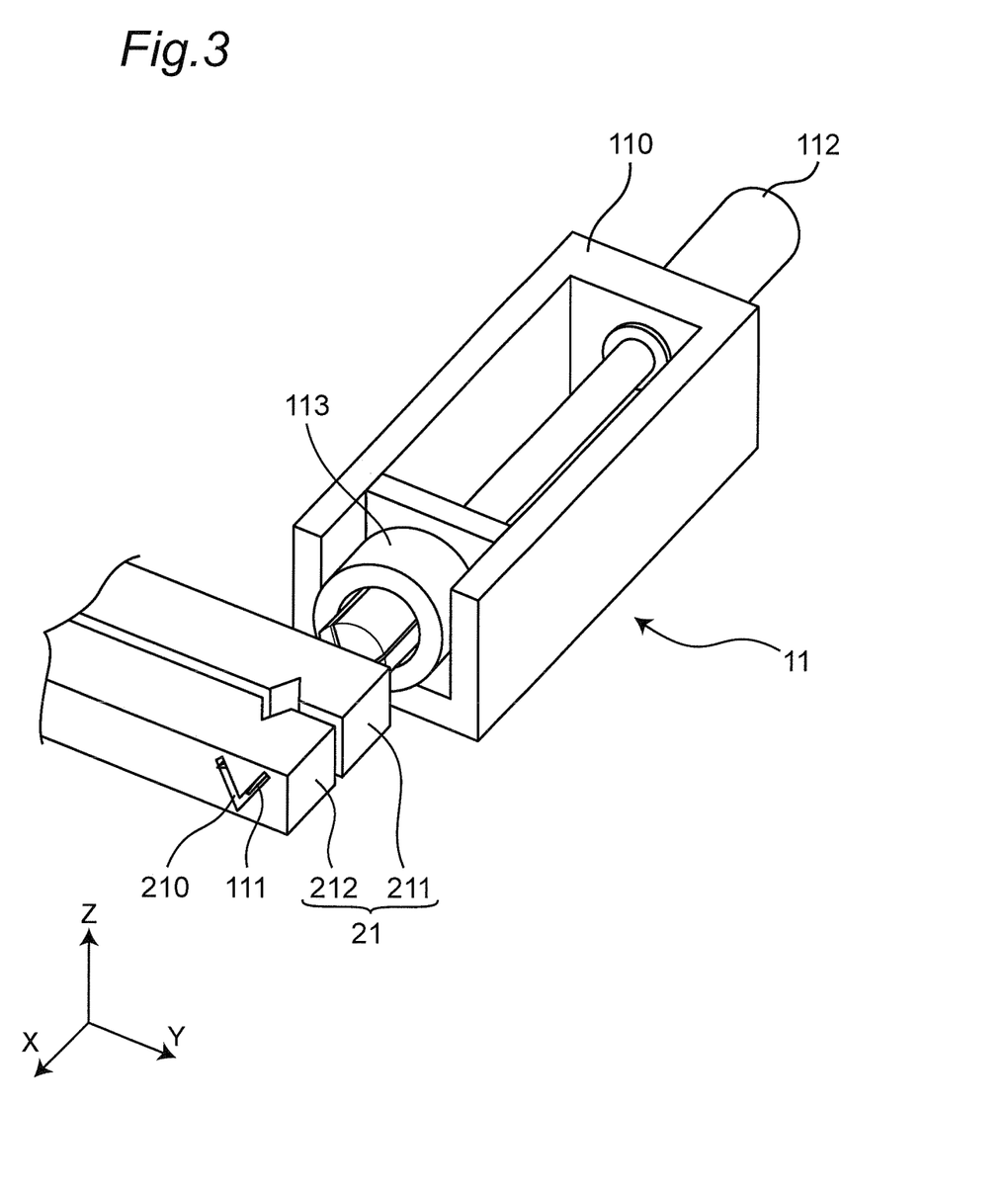
FIG. 3 is a schematic perspective view that illustrates a state in which a blade of the grafting apparatus has cut a stem of a seedling for grafting.

FIG. 2 magnifies and illustrates the scion cutting unit 11 and the arm part 21. FIG. 3 illustrates a state in which the blade 111 has been moved in the X direction and in which the stem of the scion seedling 51 has been cut thereby. In FIGS. 2 and 3, illustration of the scion seedling 51 is omitted. The scion cutting unit 11 and the arm part 21 will be described below in detail. Description on the scion cutting unit 11 and the arm part 21 applies to the rootstock cutting unit 12 and the arm part 31.

As illustrated in FIG. 2, the scion cutting unit 11 includes a body part 110 and a blade mounting part 113. The body part 110 extends in the X direction and is generally shaped like a bracket opening upward (in the Z direction) as seen looking in the X direction. The air cylinder 112 is mounted on one end surface of the body part 110 with respect to the X direction. The blade 111 and the blade mounting part 113 on which the blade 111 is mounted are housed inside the body part 110. The blade mounting part 113 is provided so that the blade mounting part 113 can be moved together with the blade 111 in the X direction in the body part 110 by the air cylinder 112.

The blade 111 extends in the X direction and is orthogonal to the arm part 21 that extends in the Y direction. As seen looking in the X direction, the blade 111 is placed inside the through hole 210 formed on the arms 211 and 212. The blade 111 is made of two plate-like blades. The blades each have a tapered shape that is gradually thinned toward a front edge thereof, that is, toward the stem of the scion seedling 51.

A cutout part 261 that extends in the Z direction and that is generally shaped like a letter V is formed on the surface of the arm 211 that faces the arm 212. The cutout part 261 is formed of nipping surfaces 261A that are two flat surfaces and that are to nip the stem of the scion seedling. A cutout part 262 that extends in the Z direction and that is generally shaped like a letter V is formed on the surface of the arm 212 that faces the arm 211. The cutout part 262 is formed of nipping surfaces 262A that are two flat surfaces and that are to nip the stem of the scion seedling.

As illustrated in FIG. 3, the blade 111 is moved together with the blade mounting part 113 in the X direction by the air cylinder 112, sequentially moves through the through hole 210 on the arms 211 and 212, and cuts the stem of the scion seedling.

Hereinbelow, a method of grafting the scion seedling 51 onto the rootstock seedling 52 with use of the grafting apparatus having above configurations will be described in detail.

Figure 4:
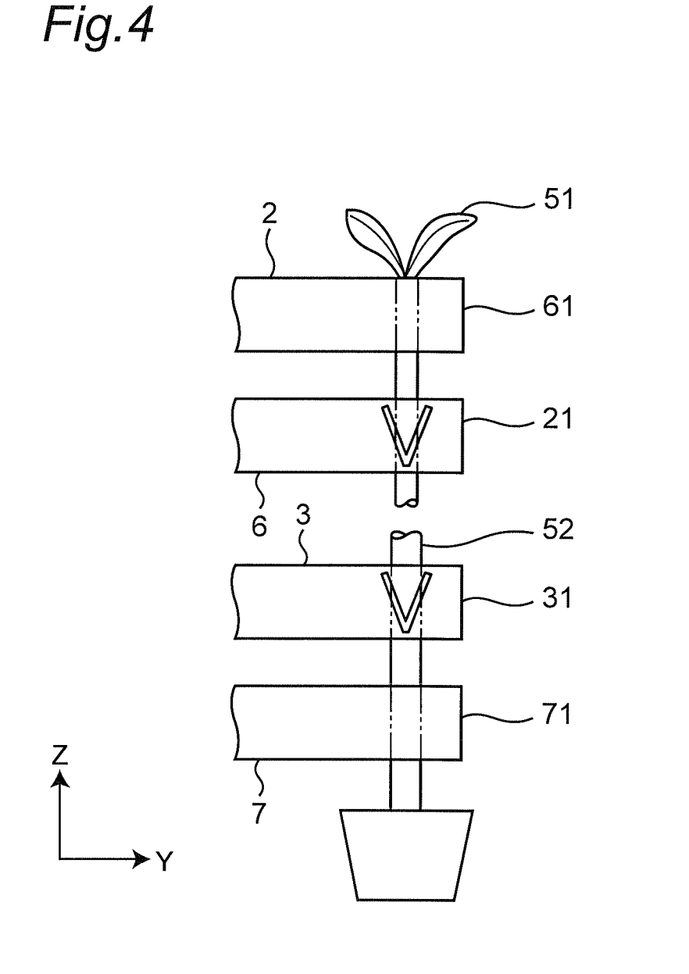
FIG. 4 is a schematic diagram that illustrates a state in which a scion clip and a scion moving clip of the grafting apparatus nip a scion seedling and in which a rootstock clip and a rootstock nipping clip nip a rootstock seedling.

FIG. 4 is a schematic diagram illustrating a state in which the scion clip 2 and the scion moving clip 6 nip the scion seedling 51 and in which the rootstock clip 3 and the rootstock nipping clip 7 nip the rootstock seedling 52, as seen looking in the X direction.

As illustrated in FIG. 4, initially, the scion seedling 51 is nipped by the arm part 21 of the scion clip 2 and the arm part 61 of the scion moving clip 6. Further, the rootstock seedling 52 is nipped by the arm part 31 of the rootstock clip 3 and the arm part 71 of the rootstock nipping clip 7.

Figure 5:
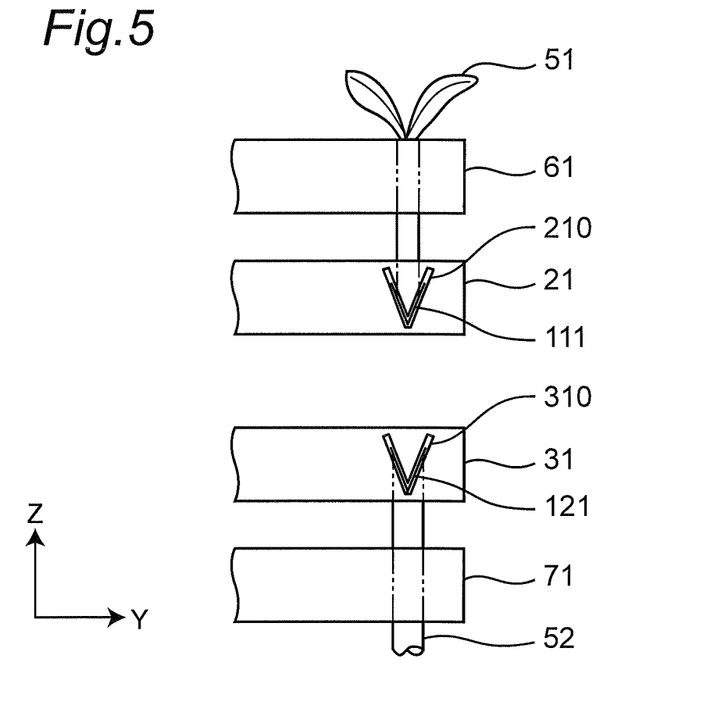
FIG. 5 is a schematic diagram that illustrates operations for cutting the scion seedling and the rootstock seedling.

FIG. 5 is a schematic diagram illustrating operations for cutting the scion seedling 51 and the rootstock seedling 52.

With the scion seedling 51 kept nipped by the arm parts 21 and 61, as illustrated in FIG. 5, the blade 111 is subsequently inserted into the through hole 210 on the arm part 21 so as to cut the scion seedling 51 into the shape like the letter V. With the rootstock seedling 52 kept nipped by the arm parts 31 and 71, on the other hand, the blade 121 is inserted into the through hole 310 on the pair of arms 31 so as to cut the rootstock seedling 52 into the shape like the letter y.

Figure 6:
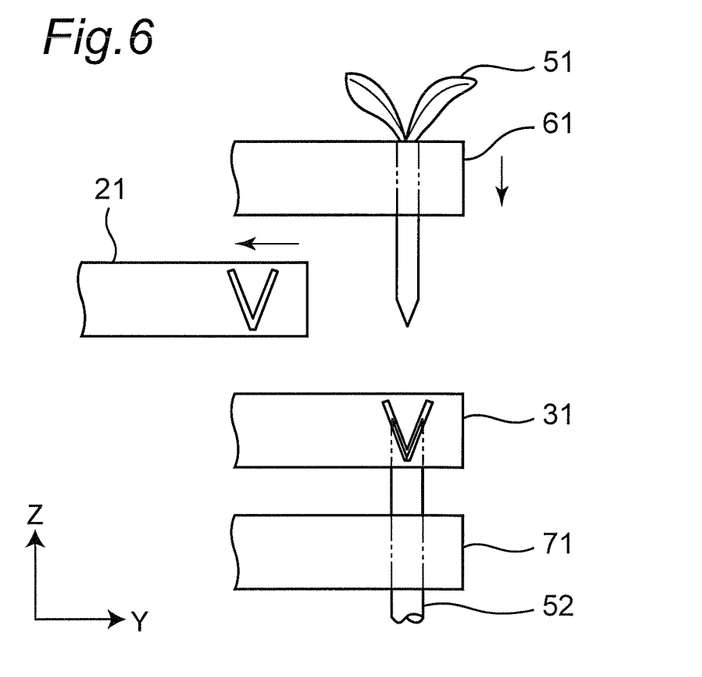
FIG. 6 is a schematic diagram that illustrates operations for moving the scion clip and the scion moving clip and making a cut surface of the scion seedling coincide with a cut surface of the rootstock seedling.

FIG. 6 is a schematic diagram illustrating operations for moving the arm parts 21 and 61 and joining a cut surface of the scion seedling 51 to a cut surface of the rootstock seedling 52.

As illustrated in FIG. 6, subsequently, the arm part 21 is brought into an opened state so as to be moved in the Y direction, that is, a direction in which the arm part 21 gets away from the scion seedling 51. By subsequent movement of the arm part 61 in the Z direction, the scion seedling 51 nipped by the arm part 61 is lowered toward the rootstock seedling 52 nipped by the arm parts 31 and 71 and the cut surface of the scion seedling 51 is joined to the cut surface of the rootstock seedling 52.

Then the cut portion of the rootstock seedling 52 remains nipped by the arm part 31. Thus a position of the cut surface of the rootstock seedling 52 can be fixed by the arm part 31 and can be prevented from being made instable due to a bend in the stem of the rootstock seedling 52 even if the stem has low rigidity. That is, the arm part 31 plays a role as a guide. As a result, the cut surface of the scion seedling 51 can easily and reliably be joined to the cut surface of the rootstock seedling 52.

Figure 7:
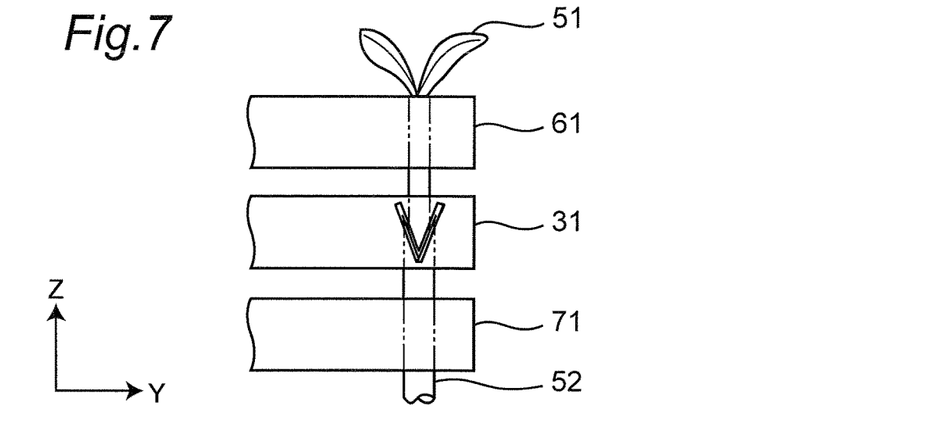
FIG. 7 is a schematic diagram that illustrates a state in which the scion seedling has been joined to the rootstock seedling.
Figure 8:
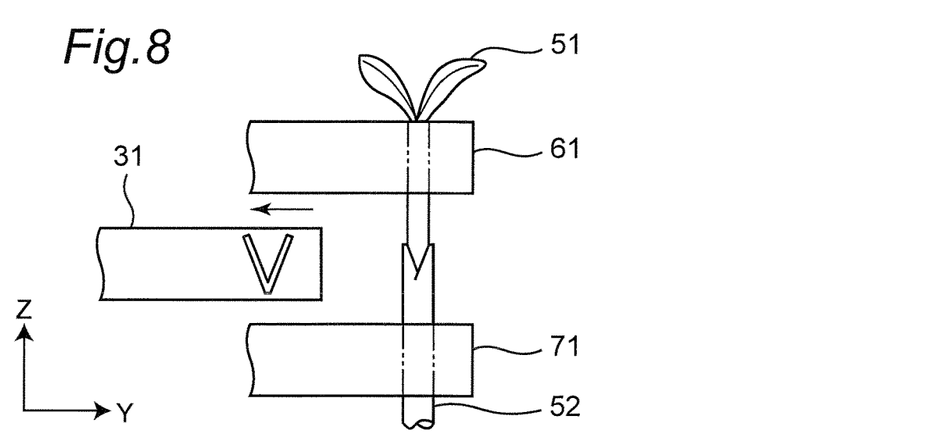
FIG. 8 is a schematic diagram that illustrates operations of the rootstock clip.

FIG. 7 is a schematic diagram that illustrates a state in which the scion seedling 51 has been joined to the rootstock seedling 52. FIG. 8 is a schematic diagram that illustrates operations of the rootstock clip.

As illustrated in FIG. 8, subsequently, the arm part 31 is brought into an opened state so as to be moved in the Y direction, that is, a direction in which the arm part 31 gets away from the scion seedling 51 and the rootstock seedling 52.

Figure 9:
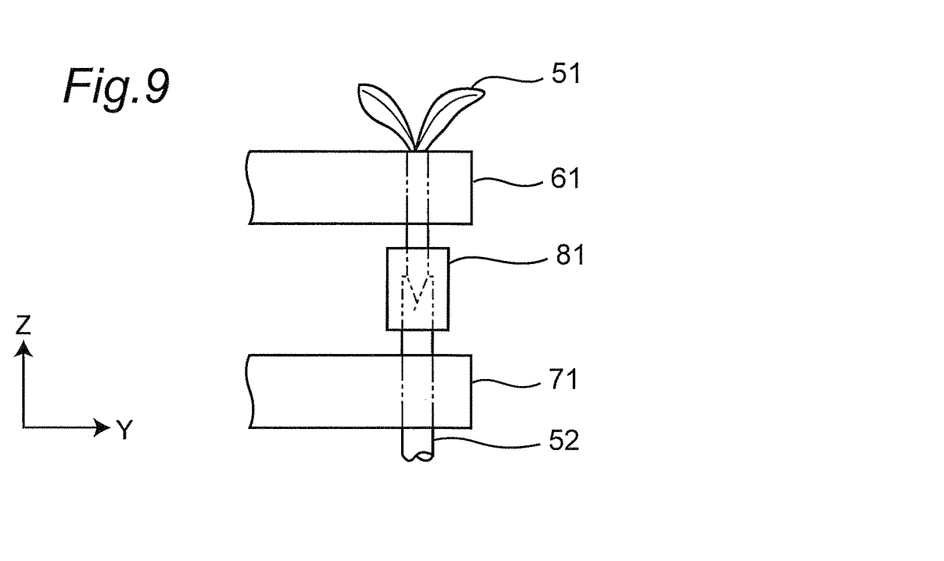
FIG. 9 is a schematic diagram that illustrates a state in which a gripper has been mounted on a joint between the scion seedling and the rootstock seedling.

FIG. 9 is a schematic diagram that illustrates a state in which a clip 81 has been mounted on a joint between the scion seedling 51 and the rootstock seedling 52.

As illustrated in FIG. 9, subsequently, the clip 81 is mounted on the joint between the scion seedling 51 and the rootstock seedling 52, so that a graft of the scion seedling 51 onto the rootstock seedling 52 is completed.

In the grafting apparatus having the above configurations, at least the portion of the through hole 210, 310 faces the portion of the stem of the scion seedling 51 or the rootstock seedling 52 that is nipped by the arm part 21 or 31 and the stem is cut by movement of the blade 111, 121 through the through hole 210, 310. Therefore, the blade 111, 121 cuts the portion of the stem that is nipped and fixed by the arm part 21, 31 and thus deformation of the stem in accordance with the rigidity of the stem and resultant variations in cutting position on the stem, shape of the cut surface of the stem, and the like can be prevented. As a result, the cutting position, the shape of the cut surface, and the like can be made constant.

The through hole 210 extends in the X direction from the nipping surfaces 261A and 262A of the arms 211 and 212 that are to nip the stem of the scion seedling 51 to the surfaces opposed to the nipping surfaces 261A and 262A with respect to the X-direction. The through hole 310 extends in the X direction from the nipping surfaces of the arms 311 and 312 that nip the stem of the rootstock seedling 52 to the surfaces of the arms 311 and 312 that are opposed to the nipping surfaces with respect to the X direction. Accordingly, the through holes 210 and 310 are independently formed on the arms 211, 212, 311, and 312 so as to be shaped like the letter V as seen looking in the X direction. Even if positions where the arms 211, 212, 311, and 312 nip the stems are changed because the stems have large sizes, for instance, consequently, there is no change in the shapes of the through holes 210 and 310 and in positions and shapes of paths through which the blades 111 and 121 move. As a result, the cutting positions, the shapes of the cut surfaces, and the like can more reliably be made constant.

When the blade 111, 121 moves through the through hole 210, 310, the stem around the blade 111, 121 is fixed by the arm 211, 212. As a result, the cutting positions, the shapes of the cut surfaces, and the like can more reliably be made constant.

The shape of the through hole 210, 310 is generally the same as the shape of the blade 111, 121, as seen looking in the direction in which the blade 111, 121 reciprocates and thus the blade 111, 121 can be guided by the through hole 210, 310 when the blade 111, 121 moves through the through hole 210, 310. As a result, the blades 111 and 121 can be prevented from being greatly deformed.

As seen looking in the direction in which the blade 121 reciprocates, the blade 121 is shaped like the letter y. In case where the cut surface of the stem of the rootstock seedling 52 is to be shaped like the letter y in order that a survival rate in grafting may be increased, for instance, therefore, the stem has only to be cut one time by the blade 121 and the cut surface of the stem can easily and reliably be shaped like the letter y.

By the grafting apparatus which has the seedling-cutting apparatus and in which the stems of the scion seedling 51 and the rootstock seedling 52 are cut by the seedling-cutting apparatus, the variations in the cutting positions on the stems of the scion seedling 51 and the rootstock seedling 52, the shapes of the cut surfaces of the stems, and the like can be prevented and the cutting positions, the shapes of the cut surfaces, and the like can be made constant. As a result, the cut surface of the scion seedling 51 can easily and reliably be made to coincide with the cut surface of the rootstock seedling 52, so that the survival rate in grafting between the scion seedling 51 and the rootstock seedling 52 can be increased.

In the embodiment, the through hole 210 is formed on the arms 211 and 212 of the arm part 21. Besides, the through hole 310 is formed on the arms 311 and 312 of the arm part 31, whereas there is no limitation thereto. The through hole has only to be formed on at least one of the pair of arms.

Figure 10:
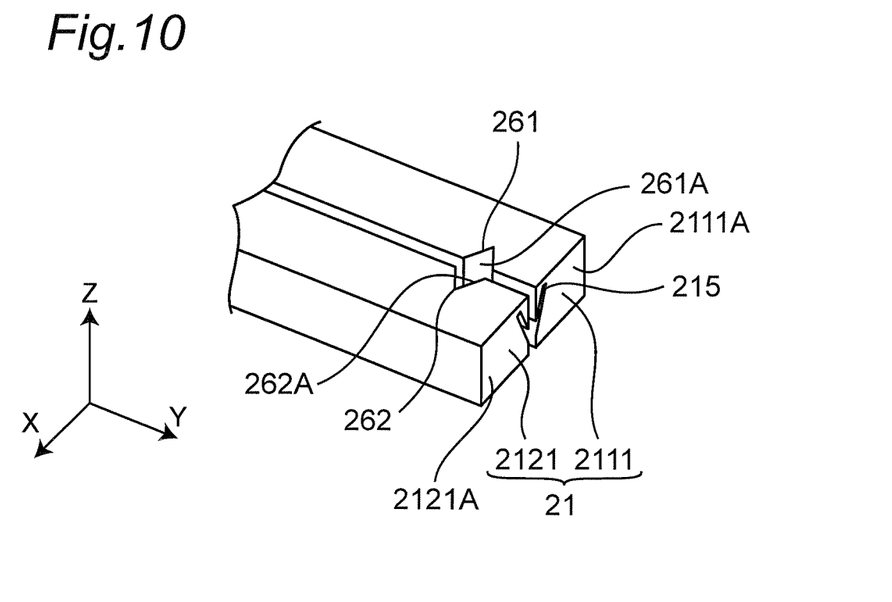
FIG. 10 is a schematic perspective view that illustrates a modification of a through hole on the scion clip.
Figure 11:
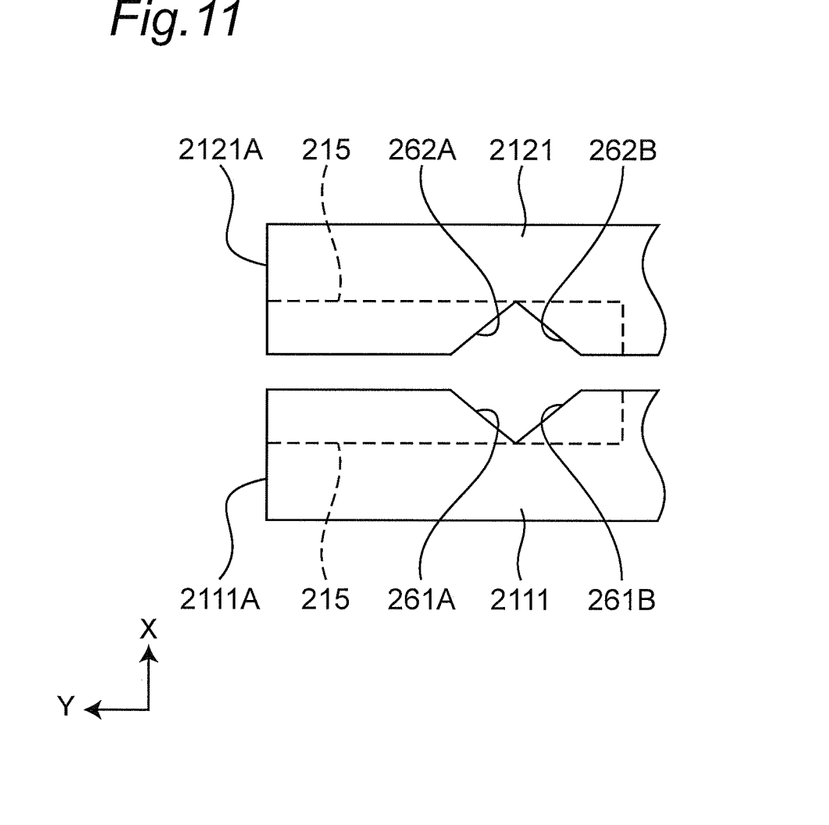
FIG. 11 is a plan view based on FIG. 10.
Figure 12:
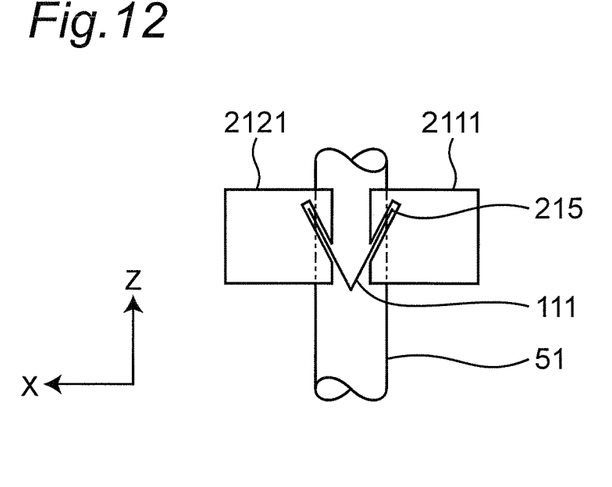
FIG. 12 is a schematic diagram that illustrates a state in which a stem has been cut with the blade inserted into the through hole of the modification.

Though the through hole 210 on the arm 211, for instance, is a through hole that extends in the X direction from the nipping surface of the arm 211 that is to nip the stem of the scion seedling 51 to the surface of the arm 211 that is opposed to the nipping surface with respect to the X direction in the embodiment, there is no limitation thereto. The through hole may extend in any direction other than the X direction. As illustrated in FIG. 10, for instance, a through hole 215 may extend in the Y direction and may spread over two arms 2111 and 2121 so as to be shaped like a letter V. As illustrated in FIG. 11, the through hole 215 penetrates a front end surface 2111A of the arm 2111 and the flat surfaces 261A and 261B that form the cutout part 261. The through hole 215 also penetrates a front end surface 2121A of the arm 2121 and the flat surfaces 262A and 262B that form the cutout part 262. Even if a stem of a seedling for grafting that has a large diameter increases a distance between the arms 2111 and 2121 so that the through hole 215 fails to form the shape like the letter V, as illustrated in FIG. 12, in this configuration, downward movement of the blade 111 makes it possible to insert the blade 111 into the through holes 215 and to thereby cut the stem. The pair of arms 2111 and 2121 is an example of the pair of arms of the invention. The through hole 215 is an example of the through hole of the invention.

Figure 13:
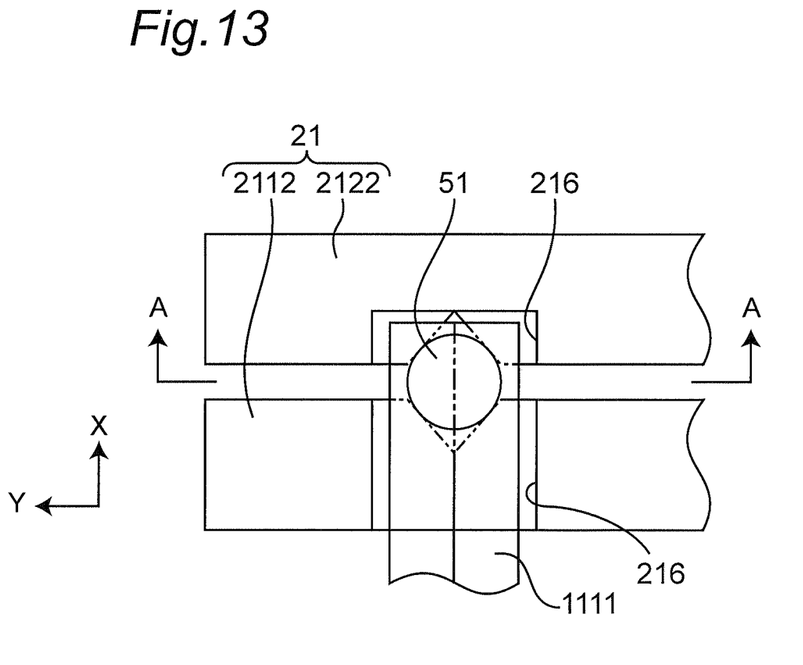
FIG. 13 is a schematic plan view for illustrating a modification of an arm part of the scion clip.
Figure 14:
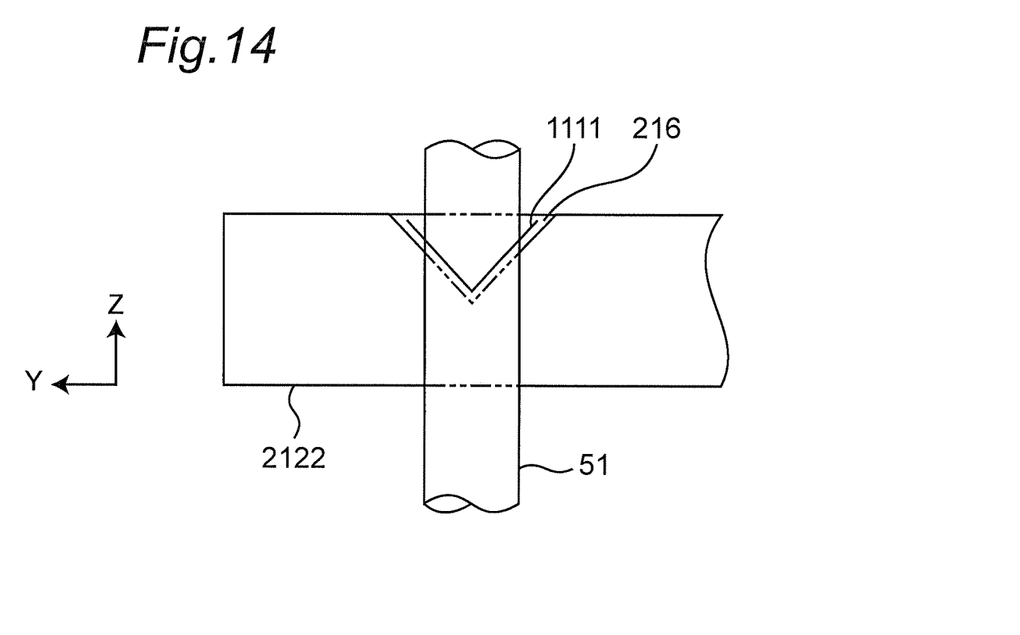
FIG. 14 is a fragmentary view taken in a direction of arrows A-A in FIG. 13.

FIG. 13 is a schematic plan view for illustrating a modification of the arm part 21 of the scion clip 2. FIG. 14 is a fragmentary view taken in a direction of arrows A-A in FIG. 13.

As illustrated in FIGS. 13 and 14, a cutout 216 that extends in the X direction and that is shaped like a letter V in section is formed on top surfaces of arms 2112 and 2122 of the arm part 21. There is provided a blade 1111 that can be reciprocated in the X direction along the cutout 216. FIGS. 13 and 14 illustrate a state at time when the blade 1111 cuts the stem of the scion seedling 51. The pair of arms 2112 and 2122 is an example of the pair of arms of the invention. The cutout 216 is an example of a cutout of the invention.

The cutout 216 penetrates the arm 2112 in the X direction. The cutout 216 is a bottomed cutout that has a predetermined depth in the X direction relative to the arm 2122.

As seen looking in the X direction, the blade 1111 is formed so as to have generally the same shape like the letter V as the cutout 216 has and is placed over the cutout 216 and at a predetermined distance from the cutout 216. Though the blade 111 is made of the two plate-like blades that each have the tapered shape which is gradually thinned toward the front end thereof, there is no limitation thereto and a flat front end part may be provided as in the blade 1111.

Figure 15:
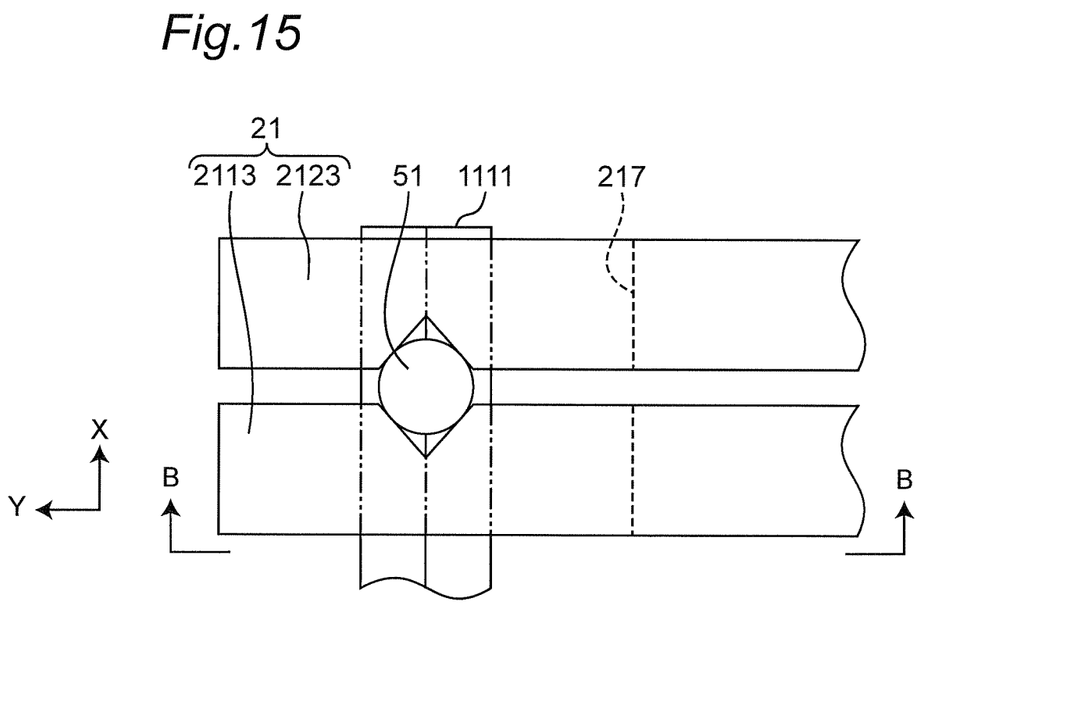
FIG. 15 is a schematic plan view for illustrating another modification of the arm part of the scion clip.
Figure 16:
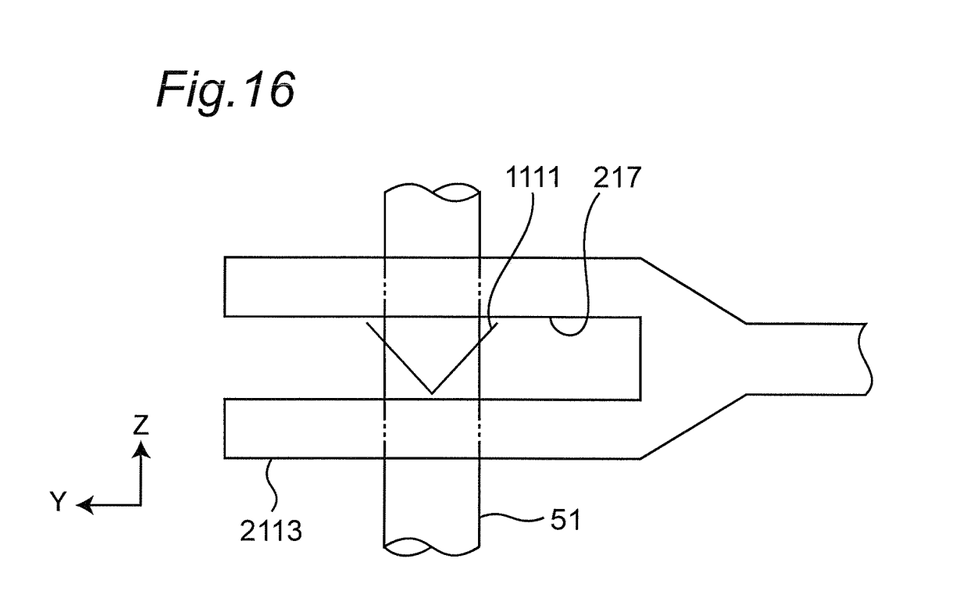
FIG. 16 is a fragmentary view taken in a direction of arrows B-B in FIG. 15.

FIG. 15 is a schematic plan view for illustrating another modification of the arm part 21 of the scion clip 2. FIG. 16 is a fragmentary view taken in a direction of arrows B-B in FIG. 15.

On arms 2113 and 2123 of the arm part 21, as illustrated in FIGS. 15 and 16, a cutout 217 that is generally shaped like a bracket opening in the Y direction as seen looking in the X direction is formed. The cutout 217 penetrates the arms 2113 and 2123 in the X direction. The blade 1111 is placed generally at a center part of the cutout 217 and is configured to be reciprocated in the X direction in the cutout 217. FIGS. 15 and 16 illustrate a state at time when the blade 1111 cuts the stem of the scion seedling 51. The pair of arms 2113 and 2123 is an example of the pair of arms of the invention. The cutout 217 is an example of the cutout of the invention.

Though the through holes 210, 310 are shaped like the letter V as seen looking in the X direction in the embodiment, there is no limitation thereto. The through holes may have any shapes such as a square shape and a shape like a letter y as seen looking in the X direction as long as the blades can move through the through holes. For instance, through holes that are each shaped like a square, a circle, an ellipse, or the like as seen looking in the X direction may be used in place of the through holes 210 and 310. In such a configuration, a blade that is shaped like a letter y or the like as seen looking in the X direction may be used in place of the blade 111 and/or a blade that is shaped like a letter V or the like as seen looking in the X direction may be used in place of the blade 121. It is desirable for the shape of the through hole as seen looking in the X direction to be made the same as or similar to the shape of the blade that is inserted into the through hole as seen looking in the X direction, in terms of firm nipping of the portion of the stem of the scion seedling 51 or the rootstock seedling 52 by the arms 211, 212 or 311, 312 with increase in contact areas between the portion of the stem of the scion seedling 51 or the rootstock seedling 52 and the arms 211, 212 or 311, 312. It is desirable for the shape of the through hole as seen looking in the X direction to be made the same as or similar to the shape of the blade that is inserted into the through hole as seen looking in the X direction, in terms of prevention of great deviation of the blade from a target position with provision of a function of the through hole for guiding the blade as well.

Though the shape of the through hole 210, 310 is generally the same as the shape of the blade 111, 121, as seen looking in the X direction in the embodiment, there is no limitation thereto. The through hole may have a shape like a square and the blade may have such a shape as the shape like the letter V or the letter y that is different from the shape of the through hole.

Though the blade 111 is formed of the two plate-like blades so as to be shaped like the letter V as seen looking in the X direction and the blade 121 is formed of the two plate-like blades so as to be shaped like the letter y as seen looking in the X direction in the embodiment, there is no limitation thereto. The blade may have any shape such as a shape like a letter Λ (inverted V) or a letter X and a shape like an arc as seen looking in the X direction. The blade may be formed from one blade into the shape like the letter V or the like.

Though the blade 121 is shaped like the letter y as seen looking in the X direction so that the cut surface of the stem is shaped like the letter y by only one cut on the stem by the blade 121 in the embodiment, there is no limitation thereto. For instance, one flat-plate-like blade may be provided so as to be rotatable about the direction in which the blade reciprocates and the cut surface of the stem may be shaped like the letter y by two cuts on the stem.

Though the scion clip 2 and the rootstock clip 3 are provided in the embodiment, there is no limitation thereto. For instance, the scion seedling and the rootstock seedling may be cut with the scion seedling and the rootstock seedling sequentially nipped by one pair of arms.

Though the cutting unit 1 includes the scion cutting unit 11 that is to cut the scion seedling 51 and the rootstock cutting unit 12 that is to cut the rootstock seedling 52 in the embodiment, there is no limitation thereto. For instance, one cutting unit may sequentially cut the scion seedling and the rootstock seedling.

The scion clip 2 and the rootstock clip 3 are provided so that the scion clip 2 and the rootstock clip 3 can be moved in the Y direction by the air cylinders and the scion moving clip 6 of the seedling moving unit 4 is provided so that the scion moving clip 6 can be moved in the Z direction in the embodiment, whereas there is no limitation thereto. For instance, the scion clip and the rootstock clip may be fixed and the seedling moving unit may be provided so that only the seedling moving unit can arbitrarily be moved in the Y direction and the Z direction, and/or the like.

Though the scion clip 2, the rootstock clip 3, and the like are provided so that the scion clip 2, the rootstock clip 3, and the like can be moved by the air cylinders in the embodiment, there is no limitation thereto. For instance, the scion clip 2, the rootstock clip 3, and the like may be provided so that the scion clip 2, the rootstock clip 3, and the like can be moved by other drive mechanisms such as elastic bodies such as springs, electric cylinders, hydraulic cylinders, and electric motors.

Though the arms 211, 212, 311, and 312 are provided so that the arms 211, 212, 311, and 312 can be moved in the X direction in the embodiment, there is no limitation thereto. For instance, the arms may be provided so as to be pivotally movable.

The cutout part 261 of the arm 211 is formed of the nipping surfaces 261A and 261B that are made of the two flat surfaces and the cutout part 262 of the arm 212 is formed of the nipping surfaces 262A and 262B that are made of the two flat surfaces in the embodiment, whereas there is no limitation thereto. For instance, the nipping surfaces may be formed of curved surfaces, may have concave or convex surfaces, and/or may have undergone surface finishing such as knurling.

It is a matter of course that a novel embodiment can be constructed by combination of two or more configurations out of all configurations described for the embodiments and the modifications.

Though the specific embodiments of the invention have been described, the invention is not limited to the embodiments and can be embodied with various modifications within the scope of the invention.

REFERENCE SIGNS LIST 21, 31 arm part
51 scion seedling
52 rootstock seedling
111, 121, 1111 blade
210, 215, 310 through hole
211, 212, 311, 312, 2111, 2112, 2113, 2121, 2122, 2123 arm
261A, 261B, 262A, 262B nipping surface

The invention claimed is:

1. A seedling-cutting apparatus comprising:
a pair of openable and closable arms that is configured to nip a portion of a stem of a seedling for grafting, the arms extending in parallel with each other in a direction intersecting with an axial direction of the stem; and
a blade that is provided so as to be capable of reciprocating in an opening and closing direction of the arms relative to the portion of the stem to cut the stem,
wherein at least one of the arms includes a through hole that penetrates a portion of the arm along a direction in which the blade reciprocates,
wherein when the arms nip the portion of the stem, at least a portion of the through hole faces the portion of the stem,
wherein the blade moves through the through hole and cuts the portion of the stem that is nipped and fixed by the pair of arms, and
wherein the blade has a letter x shaped part or a letter y shaped part as seen looking in the direction in which the blade reciprocates.

2. The seedling-cutting apparatus as claimed in claim 1, wherein the through hole extends from a nipping surface of the arm that is to nip the stem to a surface of the arm that is opposed to the nipping surface.

3. The seedling-cutting apparatus as claimed in claim 1, wherein a shape of the through hole is generally same as a shape of the blade as seen looking in the direction in which the blade reciprocates.

4. The seedling-cutting apparatus as claimed in claim 1, wherein the through hole has a letter x or y shape in the direction in which the blade reciprocates so that the blade can reciprocate through the through hole.

5. The seedling-cutting apparatus as claimed in claim 1, wherein each of the arms has the through hole having a letter x or y shape in the direction in which the blade reciprocates, so that the blade can reciprocate through the through hole of each of the arms so as to cut the stem nipped by the arms.

6. A grafting apparatus comprising the seedling-cutting apparatus as claimed in claim 1.

* * * * *